(12) United States Patent
Muraji et al.

(10) Patent No.: US 9,082,066 B2
(45) Date of Patent: Jul. 14, 2015

(54) IMAGE PROCESSING DEVICE FOR GENERATING COATING DATA, AND PRINTING DEVICE USING THE SAME

(71) Applicants: Kunio Muraji, Kyoto (JP); Toru Kawada, Kyoto (JP)

(72) Inventors: Kunio Muraji, Kyoto (JP); Toru Kawada, Kyoto (JP)

(73) Assignee: SCREEN Holdings Co., Inc. (JP)

( * ) Notice: Subject to any disclaimer, the term of this patent is extended or adjusted under 35 U.S.C. 154(b) by 0 days.

(21) Appl. No.: 14/237,671

(22) PCT Filed: Sep. 19, 2012

(86) PCT No.: PCT/JP2012/005947
§ 371 (c)(1),
(2) Date: Feb. 7, 2014

(87) PCT Pub. No.: WO2013/046599
PCT Pub. Date: Apr. 4, 2013

(65) Prior Publication Data
US 2014/0185064 A1      Jul. 3, 2014

(30) Foreign Application Priority Data
Sep. 29, 2011  (JP) ................................. 2011-214335

(51) Int. Cl.
G06F 15/00    (2006.01)
G06K 15/02    (2006.01)
B41J 2/21     (2006.01)
G06F 3/12     (2006.01)

(52) U.S. Cl.
CPC ........... *G06K 15/1876* (2013.01); *B41J 2/2114* (2013.01)

(58) Field of Classification Search
CPC .......... G06K 15/1876; G06K 15/1223; G06K 15/1238; H04N 1/60; H04N 1/405; H04N 1/6072; H04N 1/40068
USPC .................. 358/1.2, 1.9, 3.06, 3.26, 515, 534
See application file for complete search history.

(56) References Cited

U.S. PATENT DOCUMENTS

| | | | |
|---|---|---|---|
| 6,108,101 A * | 8/2000 | Cheng et al. .................... | 358/1.9 |
| 2005/0088697 A1* | 4/2005 | Yasutomi et al. .............. | 358/2.1 |
| 2006/0192984 A1* | 8/2006 | Barry et al. .................... | 358/1.9 |
| 2010/0208277 A1* | 8/2010 | Murakami et al. ............. | 358/1.2 |

FOREIGN PATENT DOCUMENTS

| | | |
|---|---|---|
| JP | 2002-264304 | 9/2002 |
| JP | 2008-200853 | 9/2008 |
| JP | 2010-208339 | 9/2010 |

OTHER PUBLICATIONS

International Search Report mailed Oct. 23, 2012 in corresponding PCT International Application No. PCT/JP2012/005947.

* cited by examiner

*Primary Examiner* — Gabriel Garcia
(74) *Attorney, Agent, or Firm* — Ostrolenk Faber LLP

(57) ABSTRACT

A print-data generating section generates print data in accordance with a high-resolution raster image generated by a high-resolution rasterizing processor. A low-resolution rasterizing processor generates a low-resolution raster image having lower resolution than that of the high-resolution raster image. An overcoating-data generating section generates coating data in accordance with the low-resolution raster image. Overcoating data is handled with low resolution, resulting in less processing time for overcoating than when the overcoating-data is handled with high resolution.

4 Claims, 7 Drawing Sheets

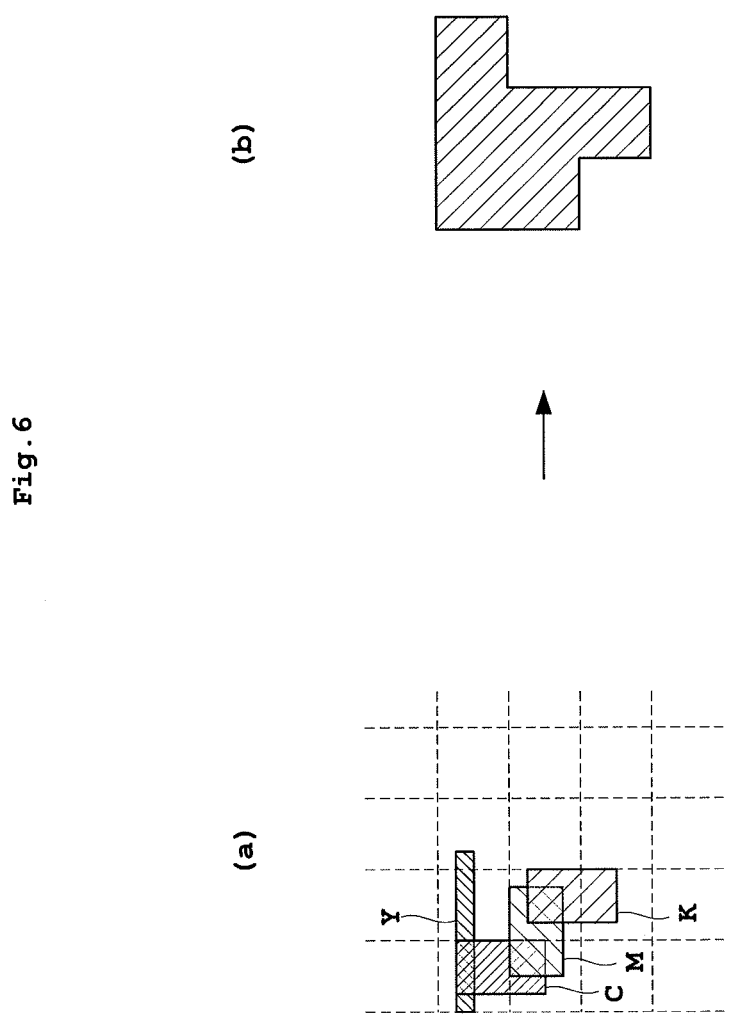

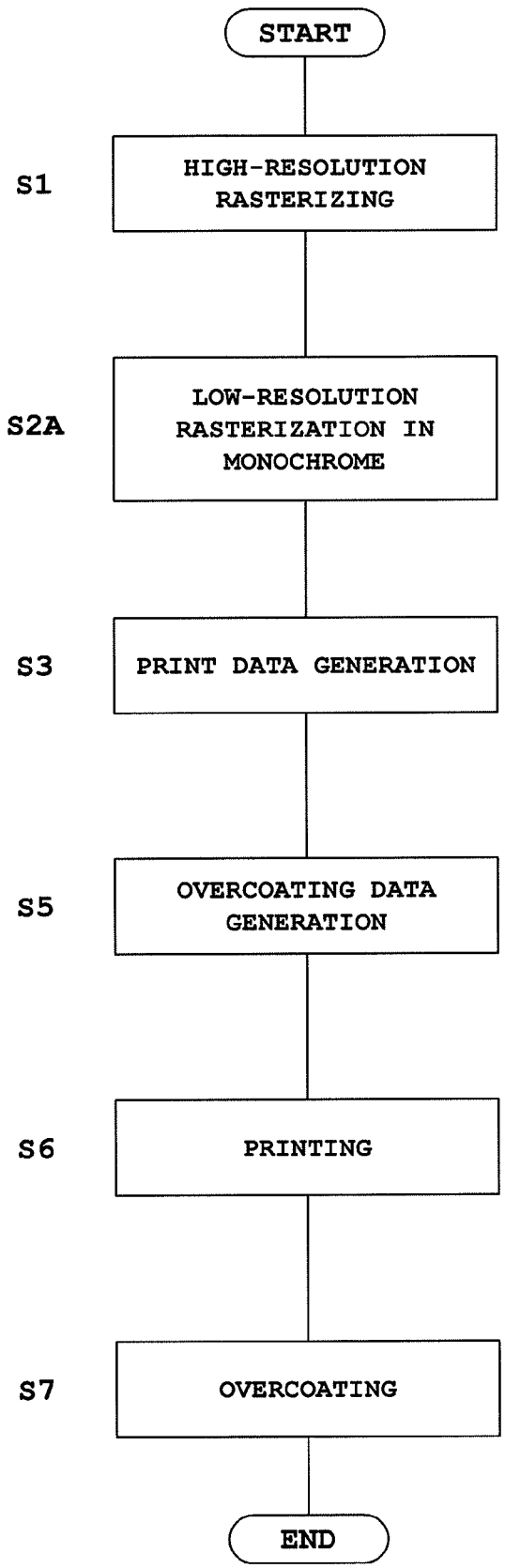

IMAGE PROCESSING DEVICE FOR GENERATING COATING DATA, AND PRINTING DEVICE USING THE SAME

CROSS-REFERENCE TO RELATED APPLICATIONS

This application is the U.S. National Phase under 35 U.S.C. §371 of International Application No. PCT/JP2012/005947 filed on Sep. 19, 2012, which in turn claims the benefit of Japanese Application No. 2011-214335, filed on Sep. 29, 2011, the disclosures of both of which applications are incorporated by reference herein. The PCT International Application was published in the Japanese language.

TECHNICAL FIELD

The present invention relates to an image processing apparatus and a printing apparatus using the image processing apparatus as well as program thereof, the image processing apparatus configured to generate coating data not directly contributing to image formation, such as overcoat processing for coating a printed region and undercoat processing for coating a region to be printed prior to performing printing.

BACKGROUND ART

Examples of the apparatus of this type conventionally include an apparatus having printing heads configured to eject ink to a printing sheet, and an overcoating section provided downstream of the printing heads in a direction of feeding the printing sheet. See, for example, Japanese Patent Publication No. 2002-264304A.

In the apparatus, the printing heads each apply ink to the printing sheet in accordance with print data on an image containing characters. Then the overcoating section downstream of the printing heads transfers an overcoating material to perform overcoat processing to a region where ink is applied. This prevents discoloration of the ink. That is, the apparatus performs thickening by one pixel around an image in accordance with the print data, and transfers the overcoating material to an area thickened by one pixel around the region where the ink is applied.

Patent Literature 1
Japanese Patent Publication No. 2002-264304A

SUMMARY OF INVENTION

Technical Problem

However, the example of the conventional apparatus with such a construction has the following problems. The conventional apparatus performs thickening to the area around the image by one pixel while holding high resolution upon the overcoat processing. This takes much time for the thickening. Such a problem may arise.

Moreover, not only the overcoat processing but undercoat processing is sometimes performed for the purpose of preventing ink droplets from spreading upon application of the ink or for the purpose of making the ink droplets stable in the printing sheet. The undercoat processing also possesses the similar problem that it takes much time for thickening.

The present invention has been made regarding the state of the art noted above, and its one object is to provide an image processing apparatus and a printing apparatus using the image processing apparatus as well as program thereof, the image processing apparatus being allowed to generate coating data with lower resolution to obtain a reduced processing time.

Solution to Problem

This invention is constituted as stated below to achieve the above object. One aspect of the present invention discloses an image processing apparatus for generating coating data in accordance with inputted image data. The apparatus includes a high-resolution rasterizing processor configured to rasterize the inputted image data with high resolution in accordance with resolution of a printing head to generate a high-resolution raster image; a low-resolution rasterizing processor configured to rasterize the inputted image data with lower resolution than the resolution to generate a low-resolution raster image; a print-data generating section configured to generate print data depending on the printing head in accordance with the high-resolution raster image; and a coating-data generating section configured to generate coating data in accordance with the low-resolution raster image.

With the aspect of the present invention, the print-data generating section generates the print data in accordance with the high-resolution raster image generated by the high-resolution rasterizing processor. The low-resolution rasterizing processor generates the low-resolution raster image with the resolution lower than that of the high-resolution raster image. The coating-data generating section generates the coating data in accordance with the low-resolution raster image. The coating data is handled with low resolution, resulting in a less processing time for generating the coating data than that when the coating data is handled with high resolution.

Here, the "coating" in the term of the coating data corresponds to "undercoat processing" or "overcoat processing". The undercoat processing performs coating to a printing area in the printing sheet prior to performing printing. The overcoat processing performs coating to a printing area in the printing sheet after performing printing. The undercoat processing is performed for the purpose of hardly spreading ink on the printing sheet or making the ink stable in the printing sheet by improving quality of the printing sheet. The overcoat processing stabilizes the printed image. For instance, the overcoat processing prevents discoloration or flake of the ink applied to the printing sheet.

Moreover, in the aspect of the present invention, it is preferable that the inputted image data is composed of color data, the low-resolution rasterizing processor generates the low-resolution raster images for each color of the inputted image data, and a combining unit is included configured to combine the low-resolution raster images for each color with the low resolution to output a combined image to the coating-data generating section.

When the inputted image data is color data, the low-resolution rasterizing processor generates the low-resolution raster images for each color of the inputted image data. Then, the combining unit combines the low-resolution raster images for each color with the low resolution to output a combined image to the coating-data generating section. Since the low-resolution raster images are generated for each color and then combined, coating data can be generated relatively faithfully to an area of each color even with the low-resolution raster images.

Moreover, in the aspect of the present invention, it is preferable that the inputted image data is composed of color data, and the low-resolution rasterizing processor generates the low-resolution raster image with the inputted image data as a monochrome image.

When the inputted image data is color data, the low-resolution rasterizing processor generates the low-resolution raster image with the inputted image data as the monochrome image. Accordingly, there is no need to perform low resolution rasterization to each color, achieving efficient generation of the coating data.

Another aspect of the present invention discloses a printing apparatus for performing printing to a printing sheet in accordance with inputted image data, and performing coating to the printing sheet with coating data in accordance with the inputted image data. The printing apparatus includes a high-resolution rasterizing processor configured to rasterize the inputted image data with high resolution to generate a high-resolution raster image; a low-resolution rasterizing processor configured to rasterize the inputted image data with lower resolution than the resolution to generate a low-resolution raster image; a print-data generating section configured to generate print data in accordance with the high-resolution raster image; a coating-data generating section configured to generate coating data in accordance with the low-resolution raster image; a printing head configured to print an image to the printing sheet in accordance with the high-resolution raster image; and a coating head configured to perform coating to the printing sheet in accordance with the coating data. Here, the high-resolution rasterizing processor rasterizes the inputted image data in accordance with resolution of the printing head, and the print data depends on the printing head.

With the aspect of the present invention, the print-data generating section generates the print data in accordance with the high-resolution raster image generated by the high-resolution rasterizing processor. The low-resolution rasterizing processor generates the low-resolution raster image having low resolution than that of the high-resolution raster image. The coating-data generating section generates the coating data in accordance with the low-resolution raster image. The coating data is handled with low resolution, resulting in a less processing time for generating the coating data than that when the coating data is handled with high resolution. Moreover, the printing head prints an image faithfully to the high-resolution raster image. The coating head roughly performs coating in accordance with the coating data. Accordingly, time for printing to the printing sheet can be significantly reduced.

Advantageous Effects of Invention

With the inkjet printing apparatus of the present invention, the print-data generating section generates the print data in accordance with the high-resolution raster image generated by the high-resolution rasterizing processor. The low-resolution rasterizing processor generates the low-resolution raster image with low resolution than that of the high-resolution raster image. The coating-data generating section generates the coating data in accordance with the low-resolution raster image. Since the coating data is handled with low resolution, a less coating time than that with high resolution can be achieved.

BRIEF DESCRIPTION OF DRAWINGS

FIG. 6 is a schematic view of a low-resolution rasterizing process and an overcoating-data generating process, FIG. 6(a) illustrating inputted image data, and FIG. 6(b) illustrating overcoating data.

FIG. 7 is a flow chart of a printing process.

DESCRIPTION OF EMBODIMENTS

Description will be given hereinafter of an image processing apparatus, a printing apparatus, and a program thereof, taking an inkjet printing system as one example.

Embodiment 1

Figure 1:
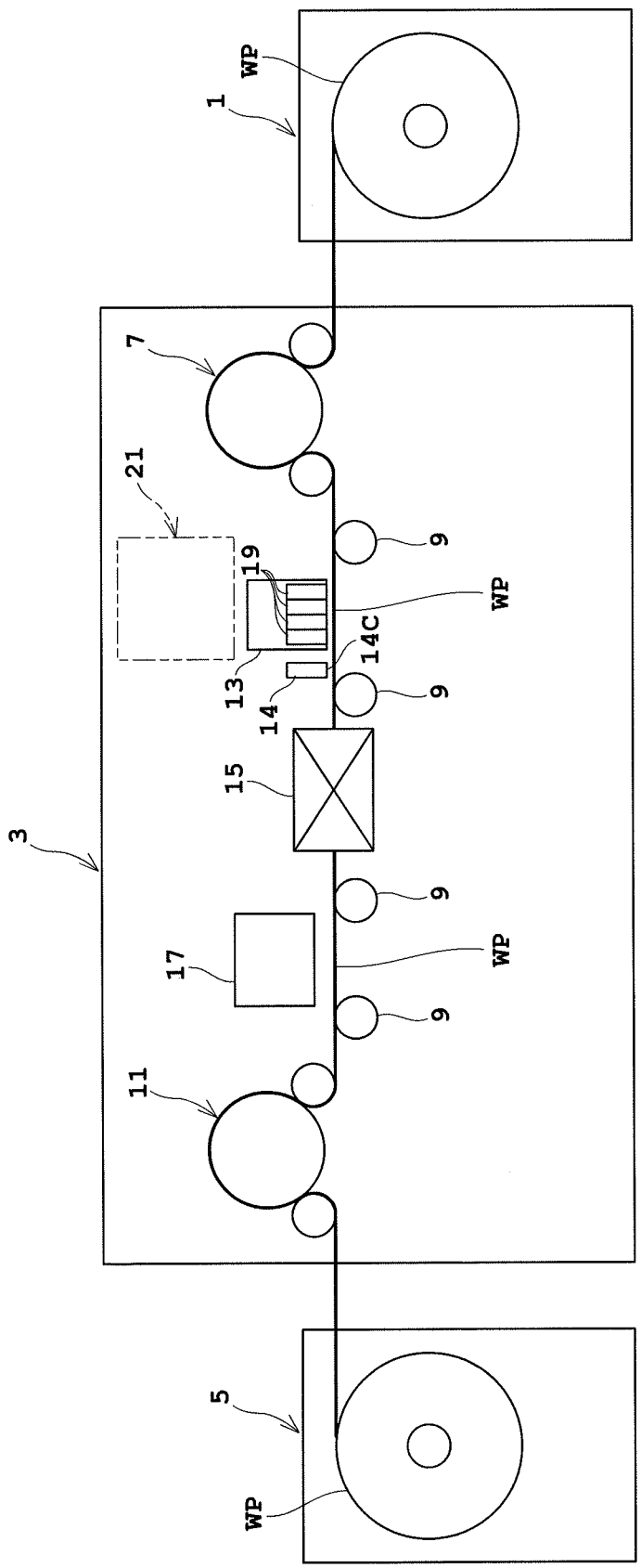
FIG. 1 is an entire view schematically illustrating an inkjet printing system according to one embodiment.

Embodiment 1 of the present invention is to be described hereinafter with reference to drawings. FIG. 1 is an entire view schematically illustrating an inkjet printing system according to Embodiment 1.

The inkjet printing system according to this invention includes a paper feeder 1, an inkjet printing apparatus 3, and a take-up roller 5. The paper feeder 1 feeds web paper WP stored in a roll form as a printing medium, for example. The inkjet printing apparatus 3 performs printing on the web paper WP fed thereto. The take-up roller 5 reels the printed web paper WP in a roll form.

The paper feeder 1 holds the web paper WP in the roll form to be rotatable about a horizontal axis, and unreels and feeds the web paper WP to the inkjet printing apparatus 3. The take-up roller 5 reels the web paper WP printed by the inkjet printing apparatus 3 about a horizontal axis. Regarding the side from which the web paper WP is fed as upstream and the side to which the web paper WP is discharged as downstream, the paper feeder 1 is disposed upstream of the inkjet printing apparatus 3 while the take-up roller 5 is disposed downstream of the inkjet printing apparatus 3.

The inkjet printing apparatus 3 includes a drive roller 7 in an upstream position thereof. The drive roller 7 takes the web paper WP from the paper feeder 1. The web paper WP unreeled from the paper feeder 1 by the drive roller 7 is transported downstream toward the take-up roller 5 on a plurality of transport rollers 9. A drive roller 11 is disposed between the most downstream transport roller 9 and the take-up roller 5. The drive roller 11 feeds the web paper WP travelling on the transport rollers 9 toward the take-up roller 5.

Between the drive roller 7 and drive roller 11, the inkjet printing apparatus 3 has a printing unit 13, an overcoat processor 14, a drying unit 15, and an inspecting unit 17 arranged in order from the upstream. The drying unit 15 dries portions printed by the printing unit 13. The inspecting unit 17 inspects the printed portions for any stains or omissions.

The print unit 13 includes ink discharging heads 19 for discharging ink droplets. A plurality of ink discharging heads 19 is arranged along a transport direction of the web paper WP. For instance, four ink discharging heads 19K, 19C, 19M, and 19Y for black (K), cyan (C), magenta (M), and yellow (Y), respectively, are provided separately. In addition, a plurality of ink discharging heads 19K, 19C, 19M and 19Y is also arranged in a horizontal direction (width direction) orthogonal to the transport direction of the web paper WP. That is, the ink discharging heads 19K, 19C, 19M and 19Y are disposed also in the width direction of the web paper WP. The ink discharging heads are enough to perform printing without moving over a printing area in the width direction of the web paper WP. That is, the inkjet printing apparatus 3 in this embodiment performs printing to the web paper WP being fed thereto, with the inkjet discharging heads 19K, 19C, 19M, and 19Y not moving for primary scanning but remaining stationary in the horizontal direction orthogonal to the transport direction of the web paper WP. This mode is called one-pass mode.

The ink discharging heads 19K, 19C, 19M, 19Y correspond to the "printing head" in the present invention.

The overcoat processor 14 provided downstream of the printing unit 13 performs overcoat processing to the web paper WP with applied ink. The overcoat processing is performed to an area where the printing unit 13 prints an image. In the overcoat processing, an overcoating material for preventing ink discoloration is discharged from an overcoat discharging head 14C so as to coat widely the area to which ink is applied. The overcoat discharging head 14C has the same construction as the ink discharging head 19, and differs from the ink discharging head 19 in material to be discharged.

The overcoat discharging head 14C corresponds to the "coating head" in the present invention.

The printing unit 13 prints an image in accordance with data from an image processing apparatus 21, and the overcoat processor 14 discharges the overcoating material, which is to be mentioned later.

Figure 2:
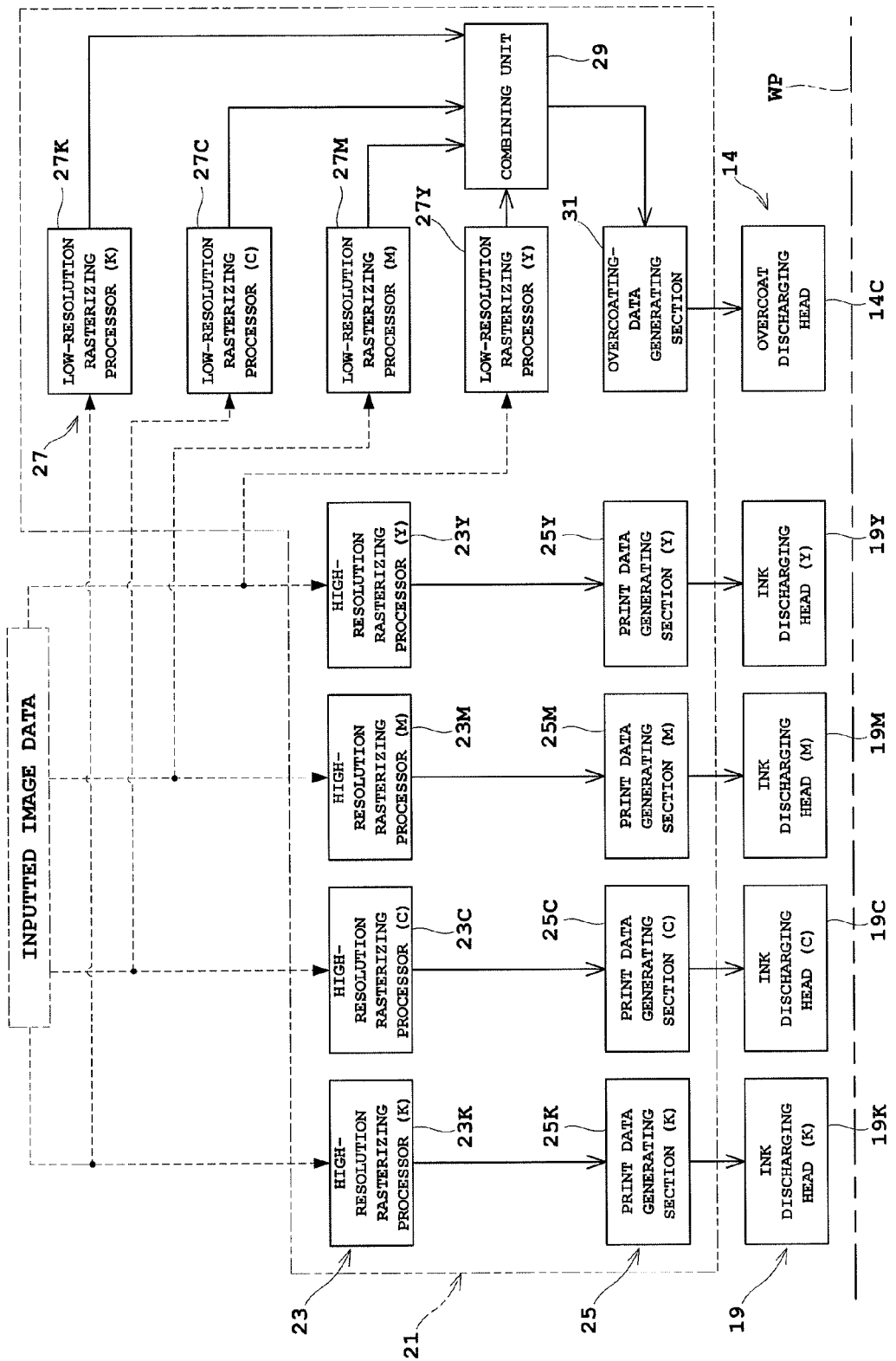
FIG. 2 is a block diagram of an image processing apparatus according to the embodiment.

Next, description will be given of the image processing apparatus 21 with reference to FIG. 2. FIG. 2 is a block diagram illustrating the image processing apparatus according to Embodiment 1.

The image processing apparatus 21 includes a high-resolution rasterizing processor 23, a print-data generating section 25, a low-resolution rasterizing processor 27, a combining unit 29, and an overcoating-data generating section 31.

The high-resolution rasterizing processor 23 includes a high-resolution rasterizing processor 23K for K, a high-resolution rasterizing processor 23C for C, a high-resolution rasterizing processor 23M for M, and a high-resolution rasterizing processor 23Y for Y. Upon receiving inputted image data, the high-resolution rasterizing processor 23 performs rasterization for each color with high resolution in accordance with resolution of the ink discharging head 19 to generate high-resolution raster images. Here, the rasterization is to transform vector image information into a raster image necessary for printing. Thus, the rasterization achieves generation of the high-resolution raster images for each color.

The print-data generating section 25 includes a print-data generating section 25K for K, a print-data generating section 25C for C, a print-data generating section 25M for M, and a print-data generating section 25Y for Y, each corresponding to the section for each color in the high-resolution rasterizing processor 23. The print-data generating section 25 for each color is correspondingly connected to the high-resolution rasterizing processor 23 for each color. The print-data generating section 25 generates print data depending on the ink discharging head 19 for each color in accordance with the high-resolution raster images from the high-resolution rasterizing processor 23. More specifically, half-toning is performed to the high-resolution raster images in accordance with the ink discharging head 19 for each color, whereby print data is generated.

The ink discharging head 19 includes an ink discharging head 19K for K, an ink discharging head 19C for C, an ink discharging head 19M for M, and an ink discharging head 19Y for Y, each correspondingly connected to the print-data generating section 25 for each color. The ink discharging head 19 discharges ink to the web paper WP while adjusting a size of ink droplets in accordance with half-toned graduation of the print data.

The low-resolution rasterizing processor 27 includes a low-resolution rasterizing processor 27K for K, a low-resolution rasterizing processor 27C for C, a low-resolution rasterizing processor 27M for M, and a low-resolution rasterizing processor 27Y for Y. The low-resolution rasterizing processor 27 performs rasterization to each color with resolution lower than that of the ink discharging head 19 in accordance with the inputted image data, thereby generating a low-resolution raster image. Here, the low resolution is, for example, quarter the resolution of the ink discharging head 19.

The combining unit 29 combines the low-resolution raster images for each color generated by the low-resolution rasterizing processor 27 with low resolution through a logical disjunction operation.

The overcoating-data generating section 31 generates overcoating data in accordance with the combined low-resolution raster image. Specifically, adding half-toning process depending on the overcoat discharging head 14C is performed to the combined low-resolution raster image. The overcoating-data generated in this way is sent to the overcoat discharging head 14C where the overcoating material is discharged to only an area corresponding to the overcoating-data to which the adding half-toning process has been already performed.

The overcoating-data generating section 31 corresponds to the "coating-data generating section" in the present invention.

Figure 3:
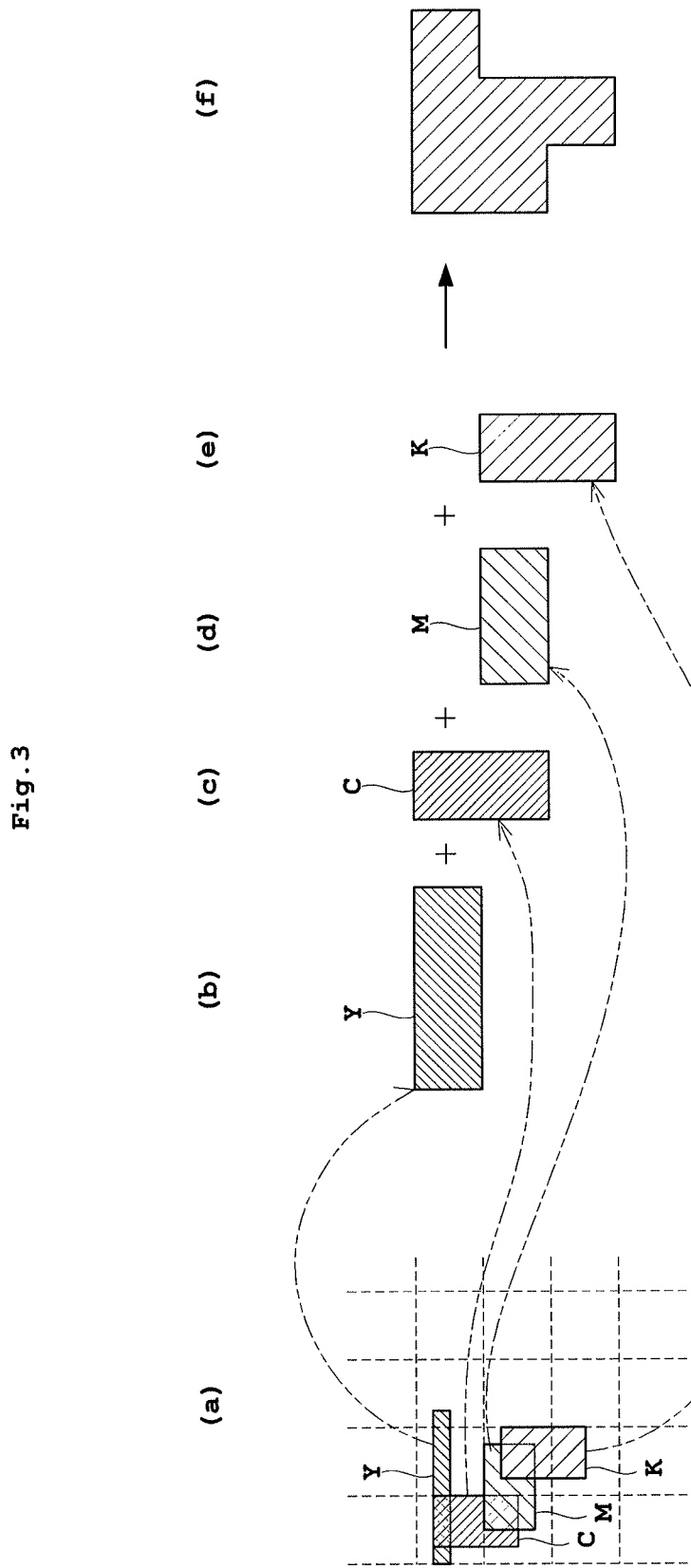
FIG. 3 is a schematic view illustrating a low-resolution rasterizing process and a coating-data generating process, FIG. 3(a) illustrating inputted image data, FIG. 3(b) illustrating data for Y, FIG. 3(c) illustrating data for C, FIG. 3(d) illustrating data for M, FIG. 3(e) illustrating data for K, and FIG. 3(f) illustrating overcoating data.

Next, description will be given of a low-resolution rasterizing process and an overcoating-data generating process with reference to FIG. 3. FIG. 3 is a schematic view illustrating the low-resolution rasterizing process and the overcoating-data generating process. FIG. 3 (a) illustrates inputted image data, FIG. 3 (b) illustrates data for Y, FIG. 3 (c) illustrates data for C, FIG. 3 (d) illustrates data for M, FIG. 3 (e) illustrates data for K, and FIG. 3 (f) illustrates overcoating data.

The low-resolution rasterizing processor 27 transforms the resolution to quarter resolution for the inputted image data. For instance, meshes illustrated by dotted lines in FIG. 3(a) are assumed with resolution thereof each quarter the resolution of the inputted image data. When one of the meshes contains just one pixel of the inputted image data, the low-resolution rasterizing processor 27 performs a transform such that the one mesh contains the inputted image data. Accordingly, the inputted image data for Y in a rectangular shape elongated horizontally in FIG. 3(a) is enlarged vertically as in FIG. 3(b) and horizontally to the right. Similarly, the inputted image data for C is enlarged vertically and horizontally to the left as in FIG. 3(c). The inputted image data for M is enlarged horizontally and vertically to the lower side as in FIG. 3(d). The inputted image data for K is enlarged vertically and horizontally to the left as in FIG. 3(e). Then logical disjunction operation is performed to the data to obtain overcoating data as in FIG. 3(f).

In order to obtain the overcoating data of the embodiment, the thickening process by one pixel around the inputted image data is not performed, but the low-resolution raster images are generated and thereafter only logical disjunction is performed to the images. Consequently, overcoating data can be obtained rapidly.

Figure 4:
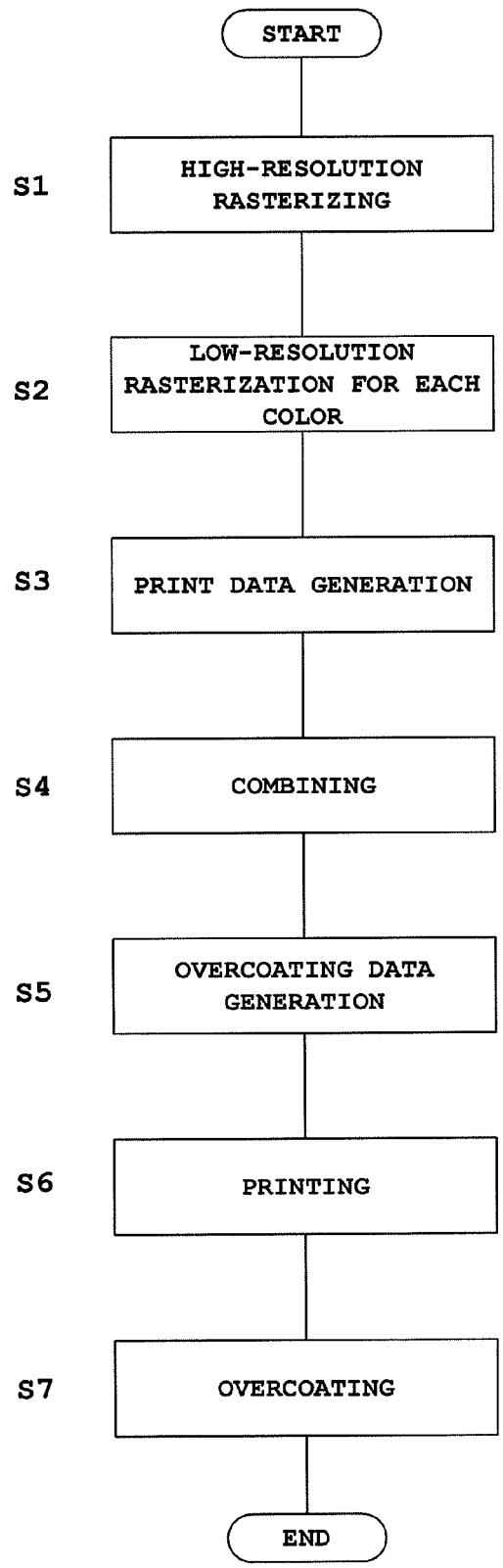
FIG. 4 is a flow chart of a printing process.

Next, description will be given of a printing process in the inkjet printing system with reference to FIG. 4. FIG. 4 is a flow chart illustrating the printing process.

Step S1

High-resolution rasterization is performed. The high-resolution rasterizing processor 23 (23K, 23C, 23M, 23Y) performs rasterization for each color with high resolution depending on resolution of the ink discharging head 19 in accordance with the inputted image data, thereby generating high-resolution raster images.

Step S2

Low-resolution rasterization for each color is performed. The low-resolution rasterizing processor 27 (27K, 27C, 27M, 27Y) performs rasterization for each color with resolution lower than that of the ink discharging head 19 in accordance with the inputted image data, thereby generating low-resolution raster images.

Step S3

Print data is generated. The print-data generating section 25 (25K, 25C, 25M, 25Y) generates print data depending on the ink discharging head 19 for each color in accordance with the high-resolution raster images from the high-resolution rasterizing processor 23.

Step S4

A combining process is performed. The combining unit 29 combines the low-resolution raster images for each color generated by the low-resolution rasterizing processor 27.

Step S5

The overcoating-data generating section 31 generates overcoating data in accordance with the combined low-resolution raster image.

Step S6

Printing process is performed. The ink discharging head 19 (19K, 19C, 19M, 19Y) performs discharge of ink droplets depending on the print data for each color, whereby an image is formed to the web paper WP.

Step S7

Overcoat processing is performed. The overcoat discharging head 14C discharges an overcoating material in accordance with the overcoating data to perform overcoat processing roughly so as to coat a region of the web paper WP where the image is formed.

With the apparatus according to the embodiment mentioned above, the print-data generating section 25 generates the print data in accordance with the high-resolution raster images generated by the high-resolution rasterizing processor 23. The low-resolution rasterizing processor 27 generates the low-resolution raster image having lower resolution than the high-resolution raster image. The overcoating-data generating section 31 generates the overcoating data in accordance with the low-resolution raster image. Since the overcoating data is handled with lower resolution, a less time for overcoat processing than that with higher resolution can be obtained. In addition, the ink discharging head 19 performs printing to the image faithfully in accordance with the high-resolution raster image. The overcoat discharging head 14C performs overcoat processing roughly in accordance with the overcoating data. This achieves reduced time for printing to the printing sheet.

Moreover, the low-resolution raster images are generated for each color and then combined. Accordingly, the overcoating data can be generated faithfully to an area for each color in the low-resolution raster images.

Embodiment 2

Figure 5:
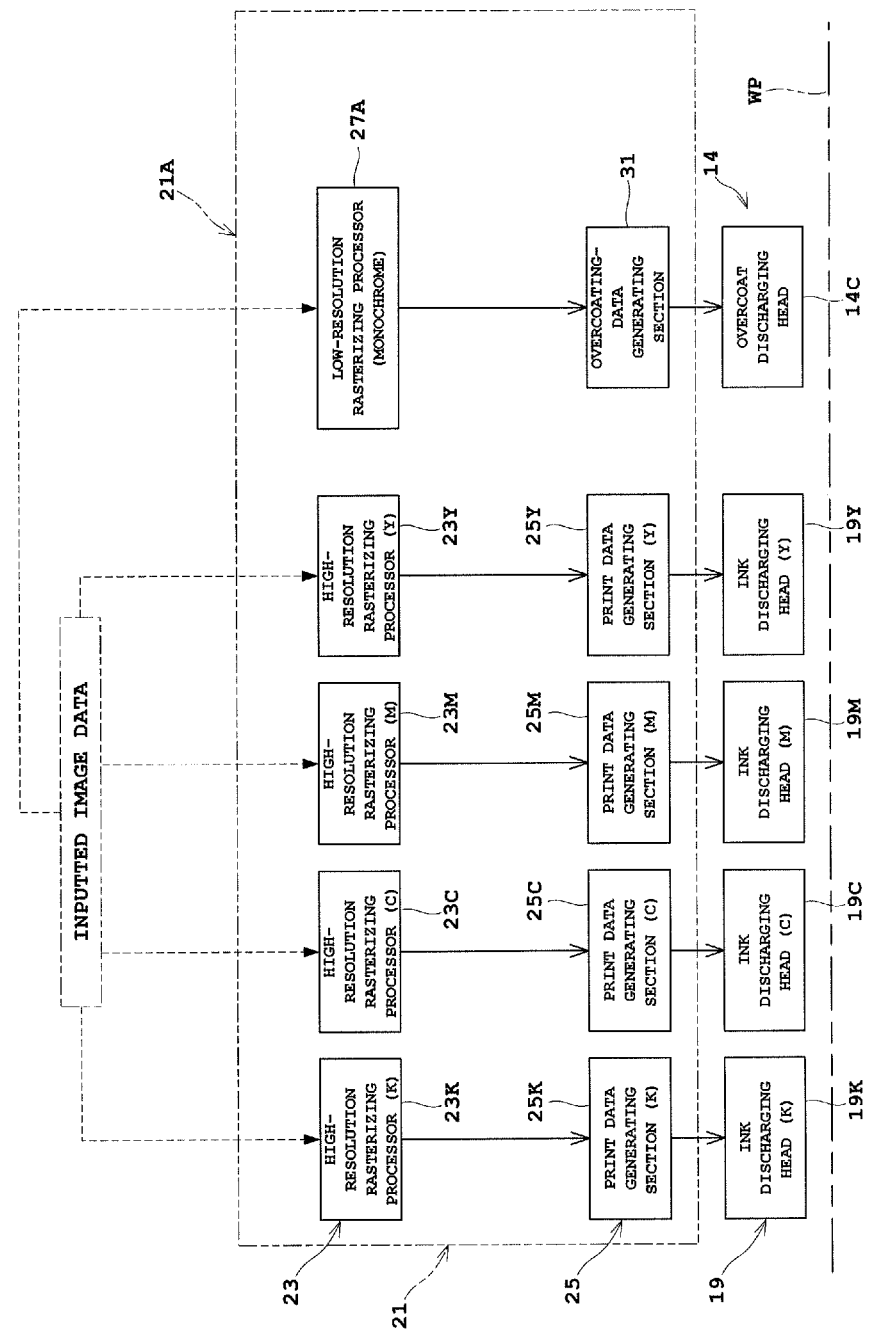
FIG. 5 is a block diagram illustrating an image processing apparatus according to another embodiment of the present invention.

Embodiment 2 of the present invention will be described next with reference to drawings. FIG. 5 is a block diagram of an image processing apparatus according to Embodiment 2. Here, an inkjet printing system of Embodiment 2 has the same construction as that in Embodiment 1 mentioned above, and thus illustration thereof is to be omitted. Like reference numerals are used to identify like parts which are the same as in Embodiment 1 mentioned above and will not be described again.

This embodiment differs from Embodiment 1 mentioned above in construction of the image processor 21A. Specifically, they differ from each other in construction of the low-resolution rasterizing processor 27A.

The low-resolution rasterizing processor 27A generates a low-resolution raster image handling the inputted image data as a monochrome image.

An overcoating-data generating section 31 generates overcoating data in accordance with the generated low-resolution raster image. Specifically, adding half-toning is performed to the generated low-resolution raster image depending on the overcoat discharging head 14C. The overcoat discharging head 14C discharges an overcoating material to only an area corresponding to the overcoating data to which adding half-toning has been already performed.

Description will be given next of a low-resolution rasterizing process and an overcoating-data generating process with reference to FIG. 6. FIG. 6 is a schematic view illustrating the low-resolution rasterizing process and the overcoating-data generating process. FIG. 6 (a) illustrates the inputted image data, and FIG. 6 (b) illustrates overcoating data.

The low-resolution rasterizing processor 27A transforms the resolution to quarter resolution for the inputted image data. Note that the inputted image data is not transformed for each color but is transformed while being handled as monochrome data. In this case, each color Y, C, M, and K in the inputted image data is handled equally. As illustrated in FIG. 6(a), the low-resolution raster image is generated while it is determined whether or not one of the meshes contains a pixel value of 1 or more of the inputted image data. Then, as illustrated in FIG. 6(b), overcoating data is generated. Such is preferable.

Next, description will be given of a printing process in the inkjet printing system mentioned above with reference to FIG. 7. FIG. 7 is a flow chart of the printing process.

Steps S1, S3, S5 to S7 are same as those in Embodiment 1 mentioned above. Embodiment 2 has a step S2A and has no step S4 in Embodiment 1, which differs from Embodiment 1.

Step S2A

Low-resolution rasterization is performed in monochrome. The low-resolution rasterizing processor 27 performed rasterization in monochrome with resolution lower than that of the ink discharging head 19 in accordance with the inputted image data, whereby a low-resolution raster image is generated.

An overcoating-data generating process is performed in accordance with the low-resolution raster image generated as above (step S5), and a printing process is performed (step S6), and thereafter an overcoating process is performed (step S7).

With the apparatus according to the embodiment, when the inputted image data is color data, the low-resolution rasterizing processor 27A generates a low-resolution raster image handling the inputted image data as a monochrome image. Consequently, there is no need to perform low-resolution rasterization for each color, achieving efficient generation of the overcoating data.

This invention is not limited to the foregoing examples, but may be modified as follows.

(1) The foregoing Embodiments 1 and 2 have been described by taking the overcoat processing as an example of the coating process. Alternatively, the present invention is applicable to undercoat processing. In this case, instead of the overcoat discharging head 14C, an undercoat discharging head may be provided upstream of the printing unit 13. Moreover, both the overcoat processing and undercoat processing may be performed. In addition, the present invention is also applicable to a coating process, other than the overcoat processing or undercoat processing, that does not contribute to image formation in the printing process.

(2) The foregoing Embodiment 1 and 2 have been described by taking the inkjet printing system as one example. Alternatively, the present invention is applicable to a printing apparatus that performs a coating process.

(3) The foregoing Embodiment 1 and 2 have a description that printing is performed to the web paper WP. Alternatively, the present invention is applicable to a printing apparatus that performs printing to cut paper, for example.

(4) In the foregoing Embodiments 1 and 2, the low resolution is quarter the resolution of the ink discharging head 19. The present invention is applicable as long as the resolution is lower than the resolution of the ink discharging head 19, and thus the resolution is not limited to this resolution.

(5) The foregoing Embodiments 1 and 2 have been described by taking the inkjet printing apparatus 3 of one-pass mode as one example. The present invention is not limited to this mode, and is applicable to an inkjet printing apparatus 3 of multi-pass mode.

Industrial Applicability

As noted above, the present invention is suitable for an image processing apparatus for generating coating data not contributing to image formation directly, a printing apparatus using the image processing apparatus, and a program thereof.

REFERENCE SIGN LIST

3 . . . inkjet printing apparatus
13 . . . printing unit
14 . . . overcoat processor
14C . . . overcoat discharging head
19 (19K, 19C, 19M, 19Y) . . . ink discharging head
21 . . . image processing apparatus
23 (23K, 23C, 23M, 23Y) . . . high-resolution rasterizing processor
25 (25K, 25C, 25M, 25Y) . . . print data generating section
27 (27K, 27C, 27M, 27Y) . . . low-resolution rasterizing processor
29 . . . combining unit
31 . . . overcoating-data generating section

The invention claimed is:

1. An image processing apparatus for generating coating data in accordance with inputted image data composed of color data, the apparatus comprising:
   a high-resolution rasterizing processor configured to rasterize the inputted image data with high resolution in accordance with resolution of a printing head to generate at least one high-resolution raster image;
   a low-resolution rasterizing processor configured to rasterize the inputted image data with lower resolution than the resolution of the printing head to generate at least one low-resolution raster image;
   a print-data generating section configured to generate print data depending on the printing head in accordance with the high-resolution raster image; and
   a coating-data generating section configured to generate coating data in accordance with the low-resolution raster image, wherein
   the low-resolution rasterizing processor generates the low-resolution raster image with the inputted image data as a monochrome image.

2. The image processing apparatus according to claim 1, wherein,
   the at least one low-resolution raster image comprises low-resolution raster images, and the low-resolution rasterizing processor generates the low-resolution raster images for each color of the inputted image data, and
   the apparatus further comprises a combining unit configured to combine the low-resolution raster images for each color with the low resolution to output a combined image to the coating-data generating section.

3. A printing apparatus for performing printing to a printing sheet in accordance with inputted image data composed of color data, and performing coating to the printing sheet with coating data in accordance with the inputted image data, the printing apparatus comprising:
   a high-resolution rasterizing processor configured to rasterize the inputted image data with high resolution to generate at least one high-resolution raster image;
   a low-resolution rasterizing processor configured to rasterize the inputted image data with lower resolution than the resolution of the printing head to generate at least one low-resolution raster image;
   a print-data generating section configured to generate print data in accordance with the high-resolution raster image;
   a coating-data generating section configured to generate coating data in accordance with the low-resolution raster image;
   a printing head configured to print an image to the printing sheet in accordance with the high-resolution raster image; and
   a coating head configured to perform coating to the printing sheet in accordance with the coating data, the high-resolution rasterizing processor rasterizing the inputted image data in accordance with resolution of the printing head, and the print data depending on the printing head, wherein
   the low-resolution rasterizing processor generates the low-resolution raster image with the inputted image data as a monochrome image.

4. The printing apparatus according to claim 3, wherein
   the at least one low-resolution raster image comprises low-resolution raster images, and the low-resolution rasterizing processor generates the low-resolution raster images for each color of the inputted image data, and
   the apparatus further comprises a combining unit configured to combine the low-resolution raster images for each color with the low resolution to output a combined image to the coating-data generating section.

* * * * *